(12) United States Patent
Simmonds

(10) Patent No.: US 10,871,649 B2
(45) Date of Patent: Dec. 22, 2020

(54) DISPLAY WITH A WAVEGUIDE COATED WITH A META-MATERIAL

(71) Applicant: BAE SYSTEMS plc, London (GB)

(72) Inventor: Michael David Simmonds, Rochester (GB)

(73) Assignee: BAE SYSTEMS plc, London (GB)

( * ) Notice: Subject to any disclaimer, the term of this patent is extended or adjusted under 35 U.S.C. 154(b) by 174 days.

(21) Appl. No.: 16/094,959

(22) PCT Filed: Apr. 10, 2017

(86) PCT No.: PCT/GB2017/050991
§ 371 (c)(1),
(2) Date: Oct. 19, 2018

(87) PCT Pub. No.: WO2017/182771
PCT Pub. Date: Oct. 26, 2017

(65) Prior Publication Data
US 2019/0121126 A1    Apr. 25, 2019

(30) Foreign Application Priority Data

Apr. 21, 2016 (GB) .................................. 1607009.6

(51) Int. Cl.
*G02B 27/00* (2006.01)
*G02B 1/00* (2006.01)
(Continued)

(52) U.S. Cl.
CPC ......... *G02B 27/0081* (2013.01); *G02B 1/002* (2013.01); *G02B 1/14* (2015.01);
(Continued)

(58) Field of Classification Search
CPC .. G02B 27/0081; G02B 5/18; G02B 27/0172; G02B 1/14; G02B 6/0026; G02B 6/005;
(Continued)

(56) References Cited

U.S. PATENT DOCUMENTS 8,233,204 B1 * 7/2012 Robbins ............. G02B 27/0149
359/15
2006/0132914 A1 6/2006 Weiss et al.
(Continued)

FOREIGN PATENT DOCUMENTS

EP          2733517 A1    5/2014
WO    WO-2014091204 A1 *  6/2014 ............. G02B 6/005
(Continued)

OTHER PUBLICATIONS

International Search Report and Written Opinion received for PCT Application No. PCT/GB2017/050991. dated Jun. 23, 2017. 16 pages.
(Continued)

*Primary Examiner* — Jade R Chwasz
(74) *Attorney, Agent, or Firm* — Finch & Maloney PLLC

(57) ABSTRACT

An apparatus is disclosed for producing an optical display comprising an optical waveguide including a first diffractive part arranged to receive display light and to diffract the display light into an angle for guided propagation along the optical waveguide. A second diffractive part of the waveguide is optically coupled to the first diffractive part by the optical waveguide and is arranged to receive and to diffract light from the first diffractive part to an angle for output from the optical waveguide. Those external surfaces of the waveguide against which guided light reflects internally are coated with a meta-material having a refractive index of value less than 1.0 (one).

20 Claims, 5 Drawing Sheets

(51) Int. Cl.
 *G02B 5/18* (2006.01)
 *G02B 27/01* (2006.01)
 *G02B 1/14* (2015.01)
 *F21V 8/00* (2006.01)

(52) U.S. Cl.
 CPC .............. *G02B 5/18* (2013.01); *G02B 6/005* (2013.01); *G02B 6/0026* (2013.01); *G02B 6/0076* (2013.01); *G02B 27/0172* (2013.01); *G02B 1/005* (2013.01); *G02B 2027/011* (2013.01); *G02B 2027/0116* (2013.01); *G02B 2207/101* (2013.01)

(58) Field of Classification Search
 CPC .............. G02B 6/0076; G02B 1/002; G02B 2027/011; G02B 1/005; G02B 2027/0116; G02B 2207/101
 USPC ........................................ 359/507
 See application file for complete search history.

(56) References Cited

U.S. PATENT DOCUMENTS

2014/0355930 A1 12/2014 Jahani et al.
2016/0349517 A1 12/2016 Miyasaka et al.

FOREIGN PATENT DOCUMENTS

WO 2015/125794 A1 3/2017
WO 2017/182771 A1 10/2017

OTHER PUBLICATIONS

GB Search Report under Section 17(5) received for GB Application No. 1607009.6 dated Oct. 24, 2016. 3 pages.
Kwon, Do-Hoon and Douglas H. Werner, "Low-index metamaterial designs in the visible spectrum," Optics Express, vol. 15, No. 15., Jul. 12, 2007, pp. 9267-9272.
Schwartz, Brian T. and Rafael Piestun, "Total external reflection from metamaterials with ultralow refractive index," J.Opt. Soc. Am. B, vol. 20, No. 12, Dec. 2003. pp. 2448 to 2453.
International Preliminary Report on Patentability received for PCT Application No. PCT/GB2017/050991. dated Nov. 1, 2018. 9 pages.

* cited by examiner

DISPLAY WITH A WAVEGUIDE COATED WITH A META-MATERIAL

FIELD OF THE INVENTION

The invention relates to a method and apparatus for providing an optical display such as, but without limitation to, an optical display employing an optical waveguide. In particular, the invention is relevant to a display device in which image-bearing light is injected into the waveguide and is subsequently released from the waveguide for viewing.

BACKGROUND

Optical waveguides for display devices of this type typically present a field of view (FOV) which is dictated by, and limited according to, the ability of the waveguide to retain light injected into it for propagation along the waveguide by total internal reflection (TIR). If light is injected into the waveguide outside of a particular angular range, then it cannot be retained by TIR for propagation along the waveguide and will simply exit the waveguide without propagating along it.

FIG. 1A shows schematically an example of a prior art optical waveguide display (1A) upon a rear surface of which is arrange a Bragg grating (2A) arranged to receive light (3A) input through an opposite surface of the waveguide so as to be incident upon a facing surface of the Bragg grating. The structure of the Bragg grating (e.g. grating constant) is such that the received light is diffracted into a diffraction order (usually the first order) to redirect the input light into light (6A) for propagation along the body of the waveguide internally by TIR between opposing internal surfaces (7A, 8A). Only the input end of the waveguide is shown. The refractive index of the material of the optical waveguide (1A) determines the angle of incidence of the diffracted light (6A) which will result in TIR, such that an angle of incidence of light (6A) within the optical waveguide when impinging upon an internal surface (7A, 8A) which is not within the permitted range will not be totally internally reflected. This angular limitation for TIR within the waveguide is in respect of a particular (first) wavelength of light to which the structure of the Bragg grating is tuned. It presents itself as an angular limitation in the total field of view (TFOV) of input light (3A) of that particular wavelength, such as green light. Extreme angular positions of the TFOV are indicated in FIG. 1 (4A and 5A).

FIG. 1B shows the result of inputting light of a second, longer wavelength (e.g. red light) which is longer than that of the light to which the Bragg grating is tuned. The Bragg grating diffracts the light of longer wavelength to an angle different to that which it diffracts light for which it is tuned (FIG. 1A). The result is that some of the light of the second wavelength entering the apparatus at and close to one of the extreme angular positions (4A) is subsequently diffracted by the Bragg grating to an angle within the waveguide (1A) which will not allow TIR of that light. Consequently, some of the input light will simply escape (60B) the waveguide. This reduces the field of view of the waveguide in respect of light having the second wavelength, as compared to the field of view in respect of light of the first wavelength.

FIG. 1C shows the result of inputting light of a third, shorter wavelength (e.g. blue light) which is shorter than that of the light to which the Bragg grating is tuned. Once more, the Bragg grating diffracts the light of shorter wavelength to an angle different to that which it diffracts light for which it is tuned (FIG. 1A). Again, the result is that some of the light of the third wavelength entering the apparatus at and close to one of the extreme angular positions (5A) is subsequently diffracted by the Bragg grating to an angle within the waveguide (1A) which will not allow TIR of that light. Consequently, some of the input light will simply escape (60C) the waveguide. This reduces the field of view of the waveguide in respect of light having the third wavelength, as compared to the field of view in respect of light of the first wavelength.

This colour variation of the total field of view of the input light into the waveguide of the display apparatus, at different colours of light, is a significant limitation.

FIG. 1D shows schematically an example of a prior art optical waveguide display (1A) shown in FIG. 1A, in which light of a first wavelength (e.g. green light) to which the Bragg grating 2A is tunes, is incident from outside the expected field of view (FOV). The Bragg grating is unable to inject all of the light of this incoming FOV into the due to the wider angles of incidence within it. This illustrates the extent of the total FOV of the waveguide in terms of a limitation of the incoming acceptance angles.

This total field of view of the input light into the waveguide of the display apparatus is a significant limitation.

The invention aims to provide an improved optical display waveguide.

SUMMARY OF THE INVENTION

At its most general, the invention is to enhance the field of view of a waveguide optical display apparatus, for a display device, that has an input diffractive part for diffracting received light for propagation along the optical waveguide within the input field of view of the apparatus defined by the limits of total internal reflection (TIR) of the waveguide. This is done by coating with a material (e.g. a meta-material, or other material) having a refractive index of value which is substantially equal to or less than about 1.0 (one), those external surfaces of the waveguide against which guided light reflects internally.

The result is a reduction in the critical internal angle for TIR of light by the coated waveguide surface when it is directed by the input diffractive part for propagation along the optical waveguide. Thus, light otherwise from outside the field of view of the apparatus can be retained by TIR and directed/guided along the waveguide for subsequent output/display.

In a first aspect, the invention may provide an apparatus for producing an optical display comprising an optical waveguide including: a first diffractive part arranged to receive display light and to diffract the display light into an angle for guided propagation along the optical waveguide by TIR; a second diffractive part optically coupled to the first diffractive part by the optical waveguide and arranged to receive and to diffract light from the first diffractive part to an angle for output from the optical waveguide; wherein those external surfaces of the waveguide against/from which guided light reflects internally are externally coated with a material (e.g. meta-material) having a refractive index of value substantially equal to or less than 1.0 (one) at optical wavelengths. Most preferably, the value of the refractive index is the value of the real part of the refractive index if the refractive index is a complex number. Most preferably, the value of the refractive index is a positive value. The material may comprise a meta-material. The meta-material may comprise a spatially periodically repeating planar array of unit cells each of which includes a magnetic resonator sandwiched between opposed conductive (e.g. silver, Ag) or meshes. The magnetic resonator may comprise a layer of alumina sandwiched between a pair of substantially plane parallel conductive plates (e.g. silver, Ag). Each wire mesh may be formed to define a grid or net of crossed conductive lines or strips, Preferably, the crossing points (e.g. defining a cross structure) of crossing conductive lines or strips within a unit cell are located adjacent the magnetic resonator within the unit cell. The crossing point of each one of the two meshes within the unit cell may be located at (e.g. upon or over) a respective one of the two conductive plates of the resonator. The crossing point(s) may substantially coincide with, or be substantially in register with, the centre axis of the magnetic resonator. Thus, the magnetic resonator of each unit cell may be sandwiched between, and centred in register with, the two opposing, in-register crossing points of the opposing conductive meshes.

Alternatively, the meta-material may comprise a spatially periodically repeating array of unit cells each of which includes a conductive wire (e.g. a nano-wire of radius/width not exceeding 50 nm, e.g. about 15 nm) The unit cells may be arranged such that the conductive wires of the meta-material are substantially parallel and spaced-apart (e.g. by between 100 nm and 300 nm, e.g. about 200 nm).

The waveguide may comprise a multi-layered slab waveguide structure including a first component slab waveguide as described above having separate input and output diffractive parts adapted/tuned for the input and output, respectively, of display light of a first colour (wavelength) and a second component slab waveguide as described above having separate input and output diffractive parts adapted/tuned for the input and output, respectively, of display light of a second colour (wavelength) different to the first colour, wherein the first and second component slab waveguides are joined by an intermediate layer of the material (e.g. a meta-material, or other material) having a refractive index of value which is substantially equal to or less than about 1.0 (one).

The waveguide (multi-layered or otherwise) may comprise a protective outer layer (e.g. a plastics material) arranged upon an outermost surface of one or each layer of the material which coats the waveguide (e.g. the meta-material).

The apparatus may comprise a light source arranged to generate the display light and for directing the display light to the first diffractive part of the waveguide for input to the waveguide thereby.

One, some or each of the diffractive parts may comprise a Bragg grating. One or more (e.g. each) diffractive part may comprise a surface profile grating (e.g. a surface profile Bragg grating). The first and second diffractive parts may be mutually conjugated. That is to say, the order into which the second diffractive part diffracts light may be opposite to the order into which the first diffractive part diffracts that light before it was received by the second diffractive part.

Benefits of such conjugation include a reduction in geometric distortions imposed on image-bearing light by diffraction occurring at the first diffractive grating region. The preferable conjugation of the second diffractive part has the effect of, to some extent, imposing geometric distortions in an opposite sense which serve to at least partly reversing the distortions imposed by the first switchable diffractive part. Chromatic dispersion is also very considerably reduced as a result of conjugation, and in practice is effectively substantially negated/removed. This is especially beneficial when a broadband optical source, such as an LED light source, is employed to generate the light input to the waveguide. This can be seen from the well-known "grating equation":

$$\sin(\theta_{in}) + \sin(\theta_{out}) = \frac{\lambda}{nd}$$

in which the angle ($\theta_{out}$) of diffraction of light of wavelength $\lambda$ incident on a grating of period d at an angle ($\theta_{in}$) to the normal to the grating, defines the order of diffraction of that output light. This is dependent upon the wavelength $\lambda$ of the light. A diffracted beam from a broadband optical source may comprise an angular split/dispersion into constituent colours (a rainbow of colours)—particularly undesirable in image-bearing light. Longer wavelengths of light are deviated most by the diffraction into a given non-zero order, and shorter wavelengths less. Conjugation of the input grating relative to the output grating addresses this.

In a second aspect, the invention may provide a method for displaying display light using an optical waveguide display comprising an optical waveguide including a first diffractive part and a second diffractive part optically coupled to the first diffractive part by the optical waveguide, the method comprising receiving display light at said first diffractive part and therewith diffracting the received display light for guided propagation along the optical waveguide by total internal reflection (TIR) to the second diffractive part; and at the second diffractive part receiving and diffracting light from the first diffractive part to an angle for output from the optical waveguide; wherein those external surfaces of the waveguide against/from which guided light reflects internally are externally coated with a material having a refractive index of value substantially equal to or less than 1.0 (one) at optical wavelengths. Most preferably, the value of the refractive index is the value of the real part of the refractive index if the refractive index is a complex number. Most preferably, the value of the refractive index is a positive value. The material may comprise a meta-material.

Any one, some or all of the diffractive parts may be either optically transmissive or optically reflective.

BRIEF DESCRIPTION OF THE DRAWINGS

There now follows a description of an exemplary, but non-limiting, embodiment of the invention for the purposes of illustration with reference to the accompanying drawings of which.

DETAILED DESCRIPTION

Figure 1A:
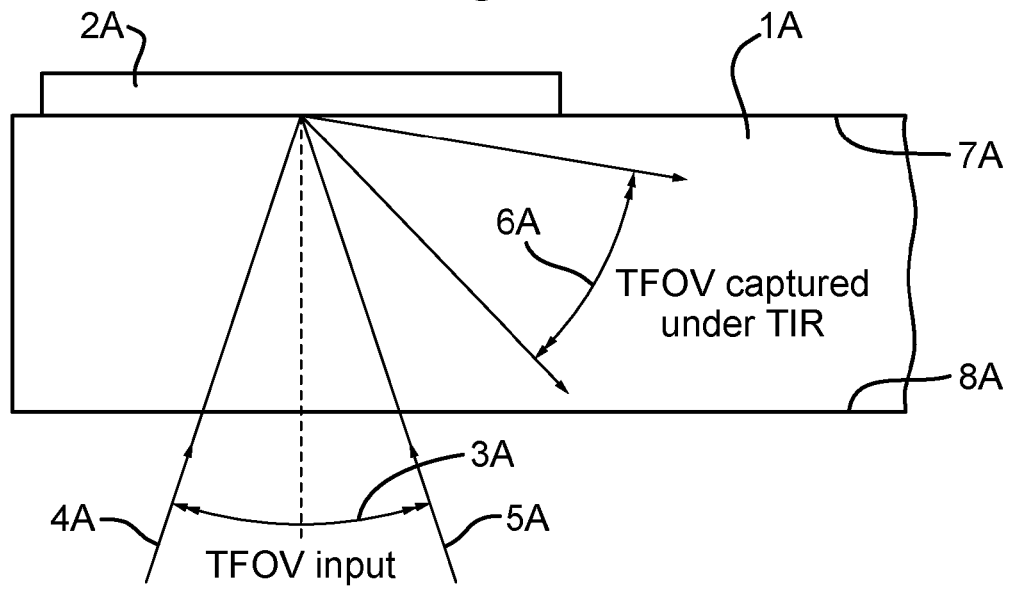
FIGS. 1A, 1B, 1C and 1D each schematically illustrate a cross-sectional view of the input end of an optical waveguide such as a slab optical waveguide, with the input of light of a wavelength (FIG. 1A) of a first wavelength (e.g. green light), with the input of light of a wavelength (FIG. 1B) of a second wavelength (e.g. red light), with the input of light of a wavelength (FIG. 1C) of a third wavelength (e.g. blue light), and of the first wavelength, but from outside the field of view (FOV) of the waveguide.
Figure 1B:
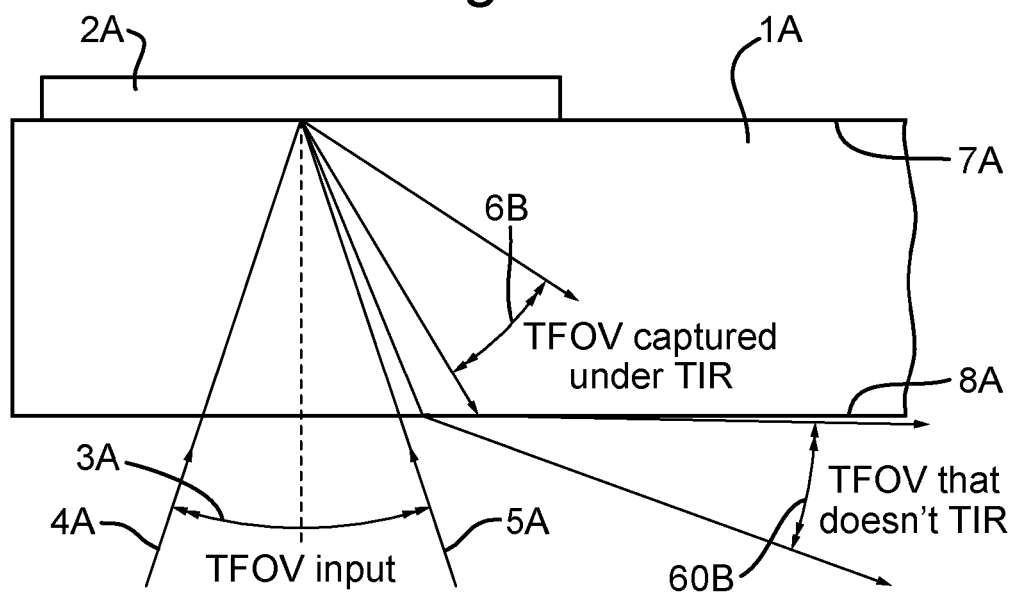
Figure 1C:
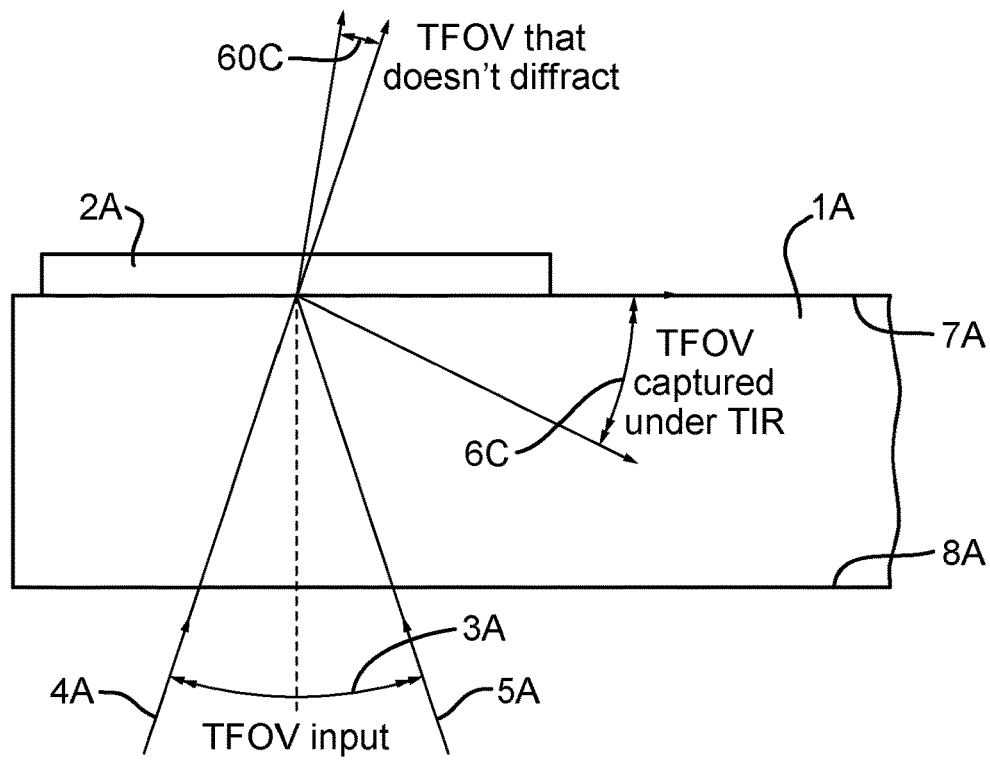
Figure 1D:
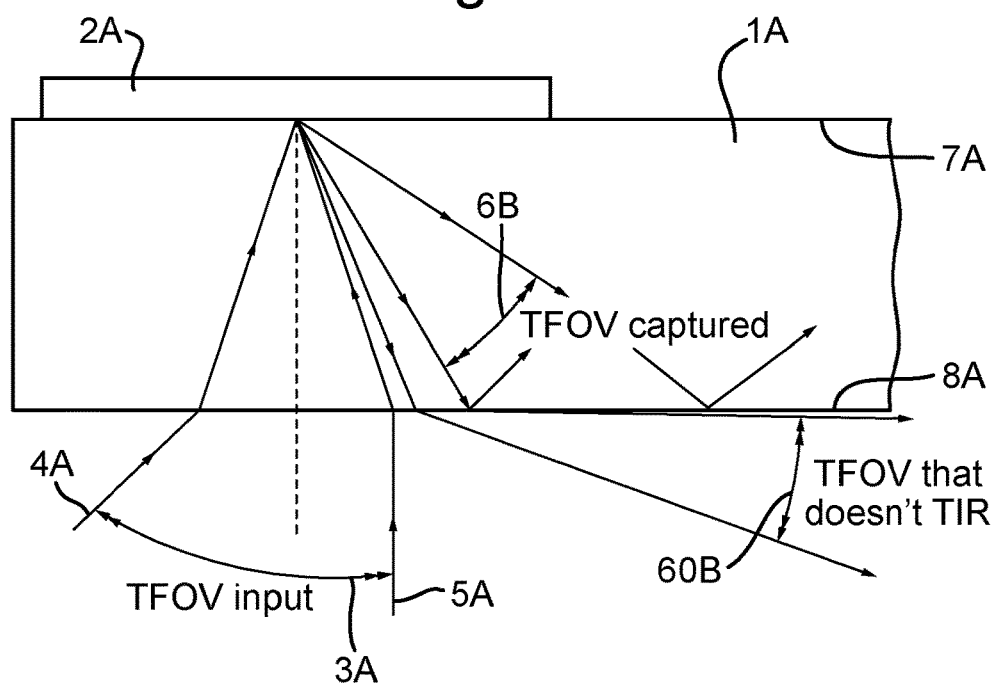

In the drawings like articles are assigned like reference symbols.

Figure 2:
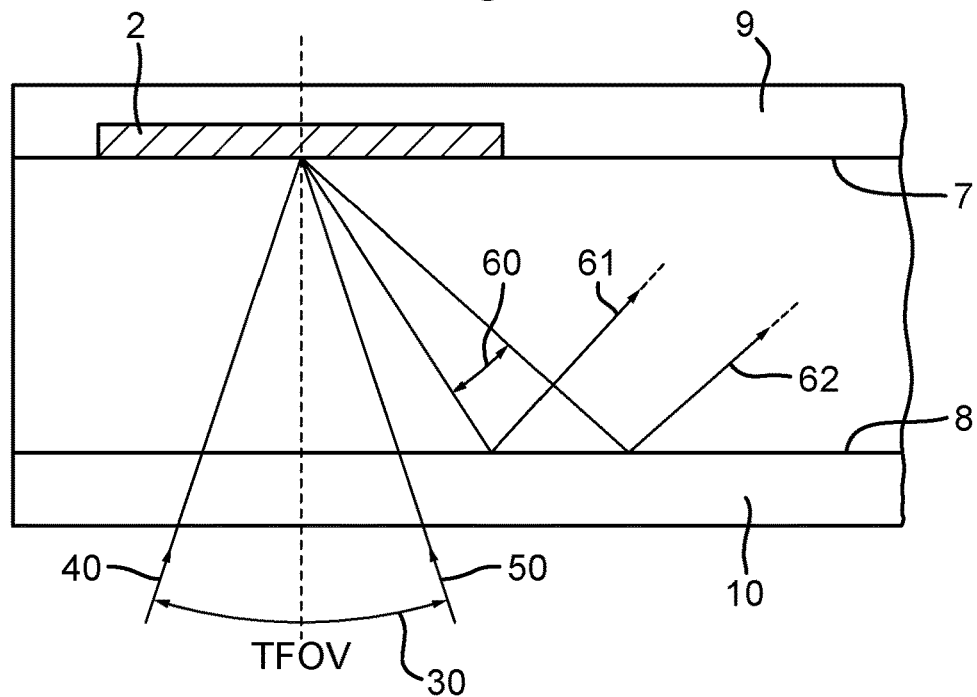
FIG. 2 schematically illustrates a cross-sectional view of the input end of a slab optical waveguide according to an embodiment of the invention, with the input of light of a wavelength of a second wavelength (e.g. red light)
Figure 3:
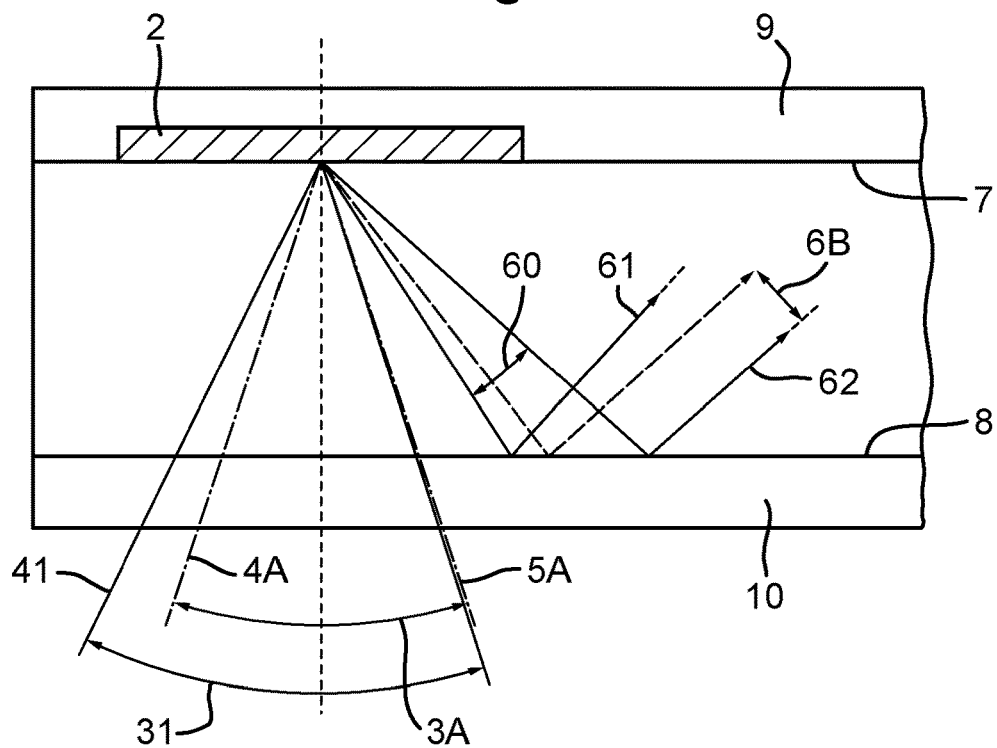
FIG. 3 schematically illustrates a cross-sectional view of the input end of a slab optical waveguide according to an embodiment of the invention, with the input of light from a wide field of view (FOV)
Figure 4:
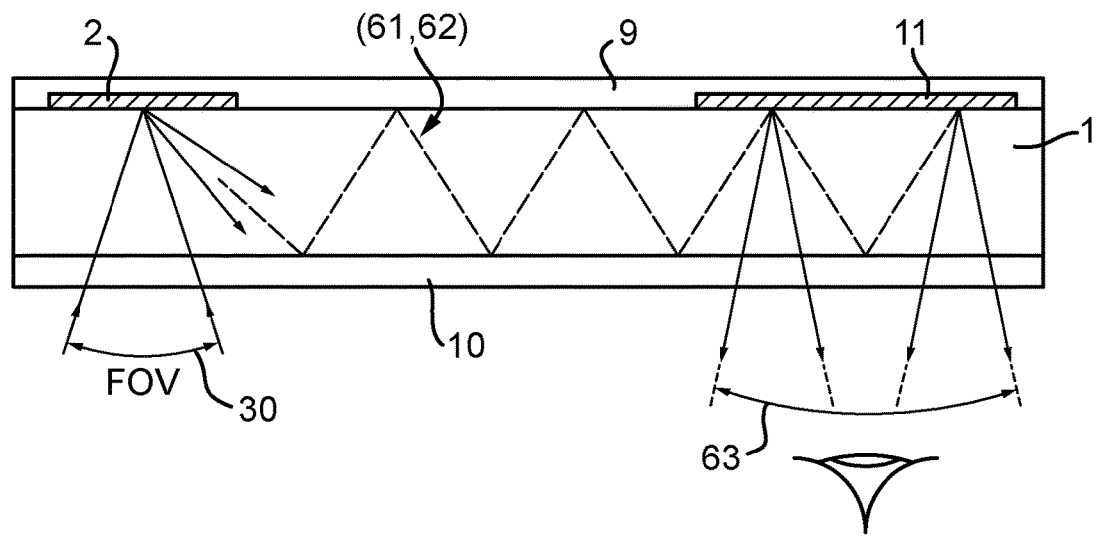
FIG. 4 schematically illustrates a slab waveguide incorporating the input end illustrated in FIG. 2 or 3, and showing the output end of the slab waveguide.

FIGS. 2 and 3 schematically illustrate a cross-sectional view of the input end of a slab waveguide for a display apparatus according to a preferred embodiment of the invention. The input end illustrated in each of these figures is shown as part of the complete optical waveguide apparatus illustrated schematically in FIG. 4.

The apparatus includes an optical waveguide (1) in the form of a slab waveguide upon a rear surface of which is formed an input Bragg grating (2) arranged and tuned for diffracting light of given wavelengths (e.g. visible light) input to the optical waveguide via an opposing surface (8) of the slab waveguide. The diffractive grating structure of the input Bragg grating (2) is arranged into an angle for guided propagation along the optical waveguide such that input light (40, 50) impinging upon the diffractive surface of the input Bragg grating is diffracted into a first diffraction order for propagation along the waveguide by total internal reflection (TIR). A second Bragg grating (11) defines an output grating optically coupled to the input grating by the optical waveguide (1). The output grating is arranged to receive display light (60) guided to it from the input Bragg grating, and to diffract that received display light to an angle for output from the optical waveguide. That is to say, display light diffracted by the output Bragg grating is directed towards the opposing internal surface (8) of the waveguide at such an angle that TIR does not occur there. Thus, some of the diffracted light impinging upon that surface is transmitted through that surface of the waveguide and out from the waveguide as display light (63) viewable by the user (typically directly viewed). Those external surfaces (7, 8) of the waveguide against which guided light (61, 62) reflects internally are coated with a meta-material (9, 10) having a refractive index of value less than 1.0 (one).

The angle at which input light is diffracted by the input Bragg grating (and subsequently, by the output Bragg grating) is determined, in part by the angle at which it is incident upon the diffractive grating surface of the input Bragg grating (2). There exists a range of input angles which result in diffraction of input light, of the selected wavelength, into an angle suitable for and capable of being captured within the slab waveguide by total internal reflection (60). This range of extreme input angles defines the total field of view (TFOV) of the input light (30) of the system. Propagation of the captured light (60; 61, 62) within the slab waveguide is supported by successive total internal reflections of the captured light between opposing internal slab surfaces (7, 8).

The meta-material (9, 10), which is arranged as a coating formed upon the optical surface (8) of the slab waveguide through which display light (40, 50) is input to the waveguide and is output (63) from it. The meta-material is also arranged as a coating formed upon the opposite/reverse optical surface (7) of the slab waveguide. Optionally the meta-material also cover the back surface of the input Bragg grating and the output Bragg grating, this being the outwardly-facing surface of the grating not directly facing (e.g. in contact with) the slab of the waveguide and which is may otherwise be exposed. This may be particularly beneficial as a protective coating to protect the Bragg gratings when they are formed upon the otherwise exposed surfaces of the slab waveguide, and may be particularly vulnerable to damage and/or contamination both of which will degrade the performance of the gratings and, therefore, the waveguide display as a whole. Protection of exposed Bragg gratings is in this way is particularly beneficial when surface-profile Bragg gratings are employed (e.g. see FIG. 5), but is also beneficial when other types of Bragg grating are used. Indeed, protection of the otherwise exposed planar surfaces of the waveguide (1) is also beneficial since it is the interface defined by those surfaces which controls the reflective performance of the corresponding internal surfaces (7, 8) of the waveguide responsible for optically coupling the input Bragg grating to the output Brag grating by the process TIR along parts of the waveguide between the two gratings.

The meta-material comprises a so-called periodic "fishnet" or mesh nano-photonic structure which imbues the meta-material with a refractive index having a value which is positive and less than 1.0 (one) at optical wavelengths. This refractive index value is no greater than that of air and therefore the meta-material is able, when n=1.0 (approx.), to at least provide a protective covering upon an otherwise exposed glass waveguide surface without detriment to the optical performance of the waveguide—i.e. the meta-material may at least optically 'mimic' air. The waveguide is then able to continue to perform as if no protective meta-material coating existed, yet be protected from damage and contamination on its glass surface (e.g. a surface grating) which would otherwise degrade its performance. Furthermore, by using a lower-index material (e.g. n<1.0), the performance of the waveguide may be enhances as well, as described in more detail below.

A preferred way in which to implement the meta-material coating, in preferred embodiments of the invention, is described by:

Ref No. 1: Do-Hoon Kwon and Douglas H. Werner: "*Low-index meta-material design in the visible spectrum*". OPTICS EXPRESS; Vol. 15, No. 15, 23 Jul. 2007, pp 9267-9272.

Another preferred way is disclosed in:

Ref. No. 2: B. T. Scwartz and R Piestun: "*Total external reflection from meta-materials with ultra-low refractive index*". J. Opt. Soc. Am. B 20, 2003, pp 2448-2453.

The effect of the low refractive index of the meta-material coatings (9, 10) is to reduce the critical angle ($\theta_{TIR}$) at which diffracted display light (61, 62) is able to undergo total internal reflection at the internal surfaces (7, 8) of the waveguide (1).

According to Snell's law:

$$\sin\theta_{TIR} = \frac{n_0}{n_{wg}}$$

where $n_{wg}$ is the refractive index of the waveguide material (e.g. glass: $n_{wg}$=1.5, approx., depending on the glass used) and $n_0$ is the refractive index of the meta-material. Thus, the smaller $n_0$ is then the smaller is $\theta_{TIR}$.

For a nominal reference wavelength $\lambda$ (e.g. green light), the input Bragg grating (2) complies with the grating equation:

$$\sin\theta_i + \sin\theta_{TIR} = \frac{\lambda}{n_{wg}d_{wg}}$$

Here $\theta_i$ is the angle of incidence of light input onto the Bragg grating at which the light is diffracted out by it, into the waveguide, to the critical angle ($\theta_{TIR}$). The grating has a grating pitch given by $d_{wg}$. Then, substituting Snell's law for the critical angle gives:

$$\sin\theta_i + \frac{n_0}{n_{wg}} = \frac{\lambda}{n_{wg}d_{wg}}.$$

Rearranging this gives:

$$\sin\theta_i = \frac{1}{n_{wg}}\left(\frac{\lambda}{d_{wg}} - n_0\right).$$

Consequently, if $n_0$ can be made smaller, then $\theta_i$ is permitted to be bigger—or put another way, the FOV of the waveguide increases, for a given grating and a given wavelength of light.

Similarly, this result shows that one may obtain the same field of view ($\theta_i$) for ever shorter wavelengths of light by suitably reducing the value of $n_0$ in concert with reduction in the value of $\lambda$ provided that the right-hand-side of the above equation remains constant. That is to say, $\lambda$ may be reduced by reducing no such that the difference:

$$\left(\frac{\lambda}{d_{wg}} - n_0\right)$$

does not change. As a result of applying such a low-index ($n_0$) coating the outer surfaces of the waveguide, which are those surfaces defining the interfaces from which TIR takes place internally, it has been found possible to control, advantageously, the angle of incidence of input light $\theta_i$ of input light upon the input grating of the waveguide in order to increase the field of view of the apparatus and/or to extend the wavelength range over which the apparatus is able to operate at a given field or view.

Both of these effects aim to address at least some of the deficiencies in existing waveguide display systems such as has been discussed above with reference to FIGS. 1A to 1D. This enables a colour (e.g. multi-colour or full-colour) waveguide display with a wider field of view.

Given a complex refractive index: m=n+ik, and a complex impedance: Z=X+iY of the material, the relative permittivity: $\varepsilon=\varepsilon'+i\varepsilon''$ and the relative permeability: $\mu=\mu'+i\mu''$ of the material are defined by:

$$m = \sqrt{\mu\varepsilon}\;;\;\mathrm{Im}(m) \geq 0$$

and $$Z = \sqrt{\frac{\mu}{\varepsilon}}\;;\;\mathrm{Re}(Z) \geq 0$$

Figure 6:
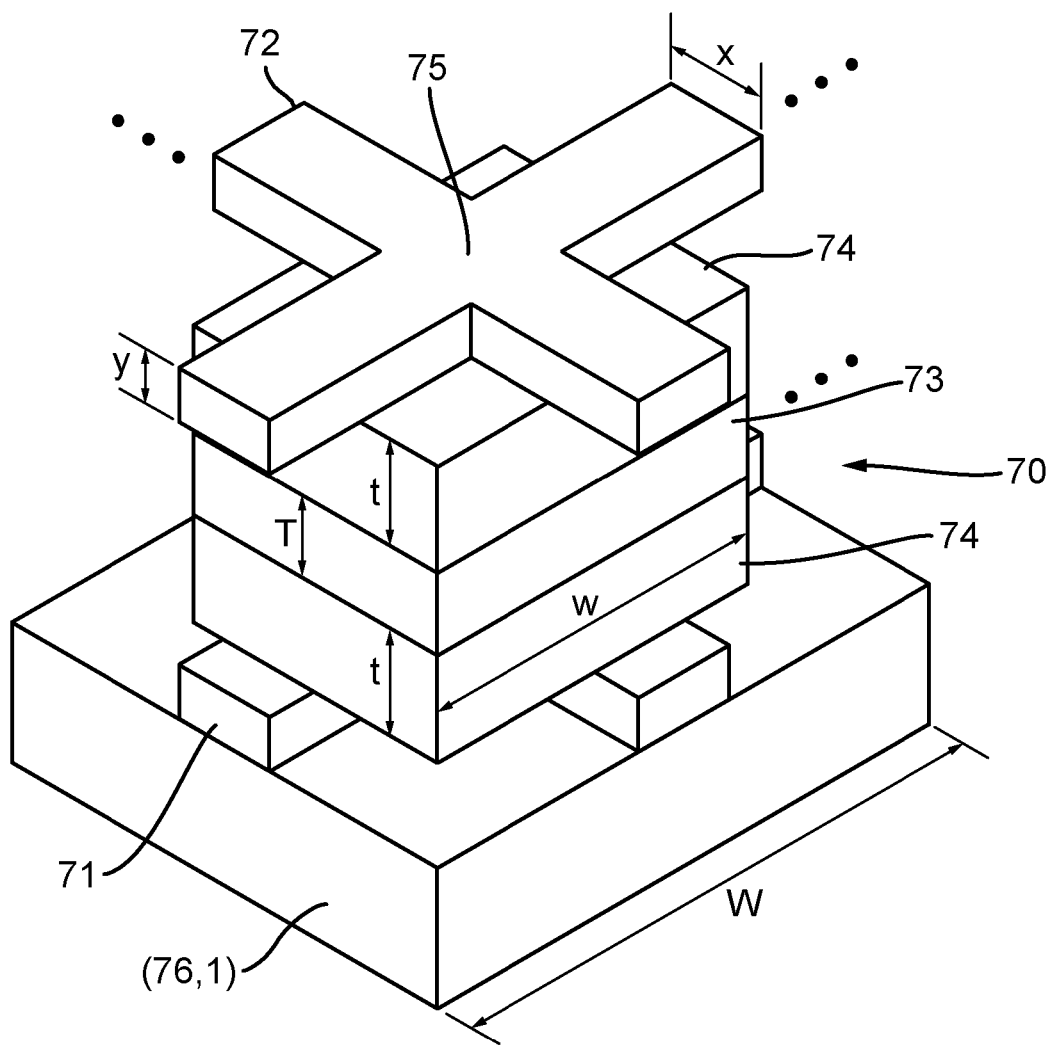
FIG. 6 schematically illustrates the structure of a unit cell of a meta-material.

It is possible to find a set of values for m and Z by independently adjusting the values of $\varepsilon$ and $\mu$. This may be achieved by implementing certain structures within the unit cells of the meta-material. For example, the meta-material may comprise a unit cell such as is schematically illustrated in FIG. 6. This unit cell comprises a magnetic resonator (70) arranged between two opposing parallel conductive meshes (71, 72), such as silver (Ag) wire meshes. The magnetic resonator may comprise alumina ($Al_2O_3$) sandwiched (73) between a pair of plane parallel conductive (e.g. silver) plates (74). Each mesh may be formed to define a grid or net of crossed conductive lines or strips in which the crossing points (e.g. defining a cross structure, 75) of crossing conductive lines or strips within a unit cell are located adjacent the magnetic resonator within the unit cell. The crossing point of each one of the two meshes within the unit cell may be located at (e.g. upon or over) a respective one of the two conductive plates of the resonator. The crossing point(s) may substantially coincide with, or be substantially in register with, the centre axis of the magnetic resonator. Thus, the magnetic resonator of each unit cell may be sandwiched between, and centred in register with the two opposing, in-register crossing points of the opposing conductive meshes.

Regions not occupied by the magnetic resonators, between the opposing parallel conductive meshes, may be filled with a dielectric material such as silica ($SiO_2$). This periodic structure of repeating unit cells may be formed directly upon the outer surface (e.g. glass, 76) of the slab waveguide display. A unit cell structure is schematically shown in FIG. 6, wherein one of the two conductive meshes of the metamaterial is directly in contact with the waveguide surface (1).

The structure of the magnetic resonator and the conductive meshes inside each unit cell provide a dominant influence over the values of $\mu$ and $\varepsilon$ of the meta-material, respectively. For example, the value of $\mu$ is strongly influenced by the height and width of the magnetic resonator, and the relative thicknesses of the alumina and silver layer components thereof. Similarly, the thickness and width of the conductive lines or strips of the conductive meshes strongly influence the value of $\varepsilon$. These design parameters may be selected and optimised as desired to provide a refractive index (real part) n≤1.0 at a selected optical wavelength(s) or over a range of optical wavelengths. An effective method of optimisation is described in detail in Ref. No. 1 (above), or according to any other suitable optimisation method readily available to the skilled person, and would be readily understood by the skilled person.

Referring to FIG. 6, the geometrical/structural parameters of the magnetic resonator (70) and conductive mesh (71, 72) within each unit cell may preferably be constrained to be within the following ranges listed in Table 1.

TABLE 1

Geometrical/Structural parameter ranges for optimal meta-material

| Parameter | Value |
|---|---|
| Unit Cell Width (W) | 133 nm ≤ W ≤ 400 nm |
| Magnetic Resonator Width (w) | w ≤ W |
| Conductive line/strip width (x) | x ≤ W |
| Conductive line/strip thickness (y) | 20 nm ≤ y ≤ 100 nm |
| Magnetic Resonator conductive plate thickness (t) | 20 nm ≤ t ≤ 60 nm |
| Magnetic Resonator alumna thickness (T) | 20 nm ≤ T ≤ 100 nm |

It has been found that refractive index values (real part) of 0.0≤n≤1.0 are possible optimally (e.g. by structural optimisation) when the geometric parameters fall within these ranges. In particular, the values of the set of geometrical parameters may be selected using the optimisation process described in Ref. No. 1 (above), or according to any other suitable optimisation method readily available to the skilled person, in order to achieve a required/desired value (n) for the real part of the refractive index. The imaginary part (k) of the refractive index may also be optimised, in order to control the optical attenuation properties of the meta-material.

For example, suitable parameters for achieving a value of refractive index (real part) close to zero (n=0.159) are:

| Parameter | Value |
| --- | --- |
| Unit Cell Width (W) | 345 nm |
| Magnetic Resonator Width (w) | 153 nm |
| Conductive line/strip width (x) | 307 nm |
| Conductive line/strip thickness (y) | 20 nm |
| Magnetic Resonator conductive plate thickness (t) | 39.1 nm |
| Magnetic Resonator alumna thickness (T) | 94.9 nm |

At the other extreme, suitable parameters for achieving a value of refractive index (real part) close to one (n=0.959) are:

| Parameter | Value |
| --- | --- |
| Unit Cell Width (W) | 345 nm |
| Magnetic Resonator Width (w) | 153 nm |
| Conductive line/strip width (x) | 38.3 nm |
| Conductive line/strip thickness (y) | 56.8 nm |
| Magnetic Resonator conductive plate thickness (t) | 23.2 nm |
| Magnetic Resonator alumna thickness (T) | 77.1 nm |

Other target values of $0.0 \leq n \leq 1.0$ may be achieved by optimally adjusting the design parameters according to the optimisation method described in Ref. No. 1 (above), or according to any other suitable optimisation method readily available to the skilled person.

FIG. 3 schematically illustrates a comparison between the limited total field of view (TFOV) that can be captured (6B) from an input field of view (3A) that is wider than can be captured by TIR within the slab waveguide (1A) according to the arrangements described above with reference to FIG. 1D. Also shown is the expanded input TFOV (31) captured by a preferred embodiment of the invention as described above with reference to FIG. 2. The TFOV (60) captured by the embodiment of the invention is expanded, relative to that (6B) of the arrangement of FIG. 1D, and is substantially equal to the TFOV (6B) achieved by the arrangement of FIG. 1D plus the additionally-captured part (60B) of the TFOV which is not subject to TIR by the arrangement of FIG. 1D, but is subject to TIR by the embodiment of FIG. 3. This additional TFOV capture is the result of employing the meta-material coatings (9, 10) as described above, and results in a wider total field of view (63) being presented to a user of the waveguide display by the output grating (11) of the.

Figure 5:
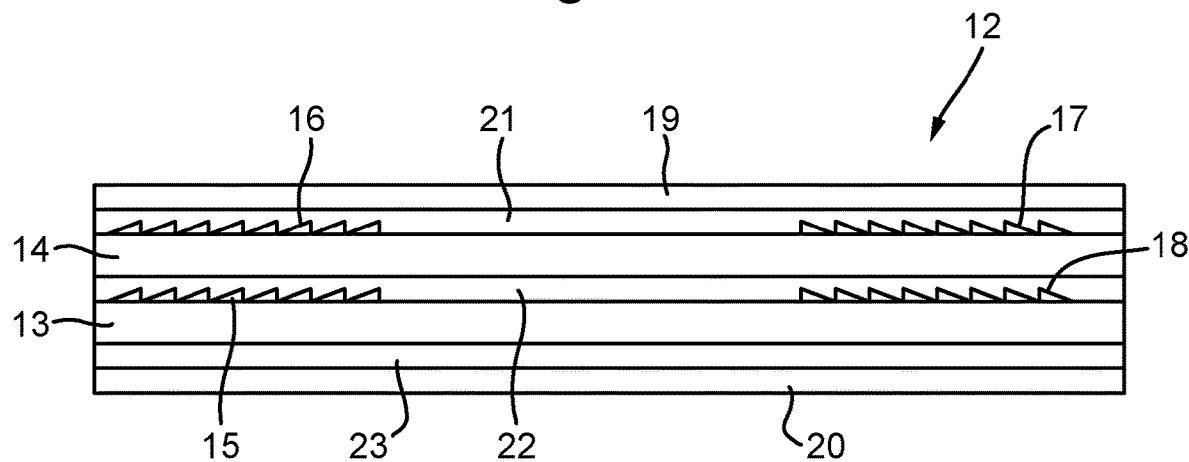
FIG. 5 schematically illustrates a slab waveguide incorporating the input end illustrated in FIG. 2 or 3, comprising four diffractive parts.

FIG. 5 shows a further embodiment of the invention in the form of a multi-layered slab waveguide structure (12). Multi-layered optical display waveguide structures may be desirable for providing multi-colour display capabilities. For example, a first component slab waveguide (13) may bear Bragg gratings (15, 18) adapted/tuned for the input/output of display light of a first colour (wavelength) and a second component slab waveguide (14) may bear Bragg gratings (16, 17) adapted/tuned for the input/output of display light of a second colour (wavelength) different to the first colour. Of course, additional layers (e.g. a third layer, not shown) may be added to such a multi-layer structure to accommodate Bragg input/output gratings tuned for use with an additional, third colour (wavelength) if desired.

This structure illustrates the protective effect achieved by applying meta-material coatings (21, 22, 23) to outer surfaces of each of two slab waveguides (13, 14) in a two-slab, parallel stacked waveguide structure. This coating allows such multi-layered waveguide structures in which component slab waveguides (13, 14) are both protected by and bound together by the same intermediate layer (22) of meta-material sandwiched between them. This layer/filling (22) prevents contaminants (e.g. dust) from entering the spacing between opposing component slab waveguides (13, 14) of the apparatus (12). It also enhances the performance of both waveguides, for the reasons described above, when combined with additional meta-material surface coatings (21, 23) arranged upon those surfaces of each component slab waveguide opposite to the surface of the respective waveguide which is coated by the intermediate layer of meta-material, so that all opposing internal surfaces of each component waveguide responsible for guiding display light by TIR bear an external coating of meta-material.

If Bragg gratings of the components slab waveguides are surface-profile diffraction grating structures, used for the input of light into the slab waveguides (15, 16) and for output of light from the slab waveguides (17, 18), then the protective effect of the meta-material coating may be particularly useful of it is extended to cover those Bragg gratings, as shown in the example of FIG. 5. An outer protective layer (19, 20) of e.g. plastic may then be applied over the external surface of each one of the two outermost layers of meta-material (21, 23) without interfering with the TIR-enhancing effects of the coating of meta-material underneath them. The outer protective layers may be chosen to strengthen the apparatus/assembly and may be chosen for their shock-absorbing properties, and/or their rigidity and resistance to flexure, and/or their scratch-resistant properties as desired.

Optionally, according to any embodiment of the invention (FIG. 4 or FIG. 5, or another implementation), the meta-material may be used simply to assist TIR performance of the/a waveguide, and may be arranged upon appropriate surfaces of a waveguide so that all opposing internal surfaces of the waveguide responsible for guiding display light by TIR bear an external coating of meta-material. Consequently, the meta-material may be omitted from surface parts of the waveguide through which it is intended that display light is to be input to or output from the waveguide, such as by a Bragg grating structure for example. Thus, in alternative arrangements, the meta-material coating may be arranged so as to not extend over, cover or obscure the operative parts of an input or output Bragg grating so that light input to the Bragg grating for diffraction, or output by a Bragg grating by diffraction does is not required to transmit through the meta-material. This avoids light losses that may occur do to optical attenuation/absorption by the meta-material. A window may be formed in a meta-material coating (10), in register over an input/output Bragg grating of desired.

The embodiments described above are for illustrative purposes and modifications, variants and all equivalents thereto, such as would be readily apparent to the skilled person, are encompassed within the scope of the invention, such as is defined by the claims for example.

The invention claimed is:

1. An apparatus for producing an optical display comprising:
   an optical waveguide having a first surface and a second surface, the second surface opposing the first surface, the optical waveguide including
      a first diffractive part on the first surface of the optical waveguide, the first diffractive part arranged to receive display light via the second surface of the optical waveguide and to diffract the display light into an angle for guided propagation along the optical waveguide, and
      a second diffractive part on the first surface or the second surface of the optical waveguide, the second diffractive part optically coupled to the first diffractive part and arranged to receive and to diffract light from the first diffractive part to an angle for output from the optical waveguide via the first surface or the second surface of the optical waveguide; and
   a material having a refractive index of value substantially equal to or less than 1.0 coating at least a portion of the first surface of the optical waveguide and/or the second surface of the optical waveguide.

2. The apparatus according to claim 1 in which one, some or each of said first and second diffractive parts is within or on said optical waveguide.

3. The apparatus according to claim 1 in which the value of the refractive index is a positive value.

4. The apparatus according to claim 1 in which the optical waveguide comprises a protective outer layer arranged upon an outermost surface of one or each layer of the material.

5. The apparatus according to claim 1 in which the material comprises a meta-material.

6. The apparatus according to claim 5 in which the meta-material comprises a spatially periodically repeating planar array of unit cells each of which includes a magnetic resonator sandwiched between opposed conductive meshes.

7. The apparatus according to claim 5 in which the meta-material comprises a spatially periodically repeating array of unit cells each of which includes a conductive wire.

8. The apparatus according to claim 7 in which the unit cells are arranged such that the conductive wires of the meta-material are substantially parallel and spaced-apart.

9. The apparatus according to claim 5 in which the meta-material comprises a spatially periodically repeating planar array of unit cells at least one of which includes a magnetic resonator sandwiched between opposed conductive meshes.

10. The apparatus according to claim 5 in which the meta-material comprises a spatially periodically repeating array of unit cells at least one of which includes a conductive wire.

11. The apparatus according to claim 1 in which the optical waveguide comprises a multi-layered slab waveguide including a first component slab waveguide having separate input and output diffractive parts adapted for the input and output, respectively, of display light of a first wavelength and a second component slab waveguide having separate input and output diffractive parts adapted for the input and output, respectively, of display light of a second wavelength different to the first wavelength, wherein the first and second component slab waveguides are joined by an intermediate layer of the material having a refractive index of value which is substantially equal to or less than about 1.0.

12. The apparatus according to claim 1 comprising a light source arranged to generate display light and to direct the display light to said first diffractive part.

13. A method for displaying display light using an optical waveguide display that includes an optical waveguide having a first surface and a second surface, the second surface opposing the first surface, the optical waveguide including a first diffractive part and a second diffractive part optically coupled to the first diffractive part, the method comprising:
   receiving display light at said first diffractive part on the first surface of the optical waveguide and via the second surface of the optical waveguide, and therewith diffracting the received display light for guided propagation along the optical waveguide by total internal reflection (TIR) to the second diffractive part; and
   at the second diffractive part on the first surface or the second surface of the optical waveguide, receiving and diffracting light from the first diffractive part to an angle for output from the optical waveguide via the first surface or the second surface of the optical waveguide;
   wherein at least a portion of the first surface of the optical waveguide and/or the second surface of the optical waveguide is coated with a material having a refractive index of value substantially equal to or less than 1.0.

14. The method according to claim 13 in which the value of the refractive index is a positive value.

15. The method according to claim 13 in which the material comprises a meta-material.

16. An apparatus for producing an optical display comprising:
   an optical waveguide having a first surface and a second surface, the second surface opposing the first surface, the optical waveguide including
      a first diffractive part on the first surface of the optical waveguide, the first diffractive part arranged to receive display light via the second surface of the optical waveguide and to diffract the display light into an angle for guided propagation along the optical waveguide, and
      a second diffractive part on the first surface of the optical waveguide, the second diffractive part optically coupled to the first diffractive part and arranged to receive and to diffract light from the first diffractive part to an angle for output from the optical waveguide via the second surface of the optical waveguide;
   wherein at least a portion of the first surface of the optical waveguide and/or the second surface of the optical waveguide are coated with a material having a refractive index of value substantially equal to or less than 1.0, the material comprising a meta-material.

17. The apparatus according to claim 16 in which the meta-material comprises a spatially periodically repeating planar array of unit cells one or more of which includes a magnetic resonator sandwiched between opposed conductive meshes.

18. The apparatus according to claim 16 in which the meta-material comprises a spatially periodically repeating array of unit cells at least some of which includes a conductive wire.

19. The apparatus according to claim 18 in which the unit cells are arranged such that the conductive wires of the meta-material are substantially parallel and spaced-apart.

20. The apparatus according to claim 16 comprising a light source arranged to generate display light and to direct the display light to said first diffractive part.

* * * * *